United States Patent [19]
Henning et al.

[11] Patent Number: 5,769,704
[45] Date of Patent: Jun. 23, 1998

[54] AIR RETURN BULKHEAD FOR REFRIGERATION TRAILERS

[75] Inventors: Steven A. Henning, Anderson, Ind.; Richard J. Gothier, Mesa, Ariz.

[73] Assignee: Aero Industries, Inc., Indianapolis, Ind.

[21] Appl. No.: 801,214

[22] Filed: Feb. 18, 1997

Related U.S. Application Data

[63] Continuation-in-part of Ser. No. 701,215, Aug. 21, 1996, abandoned.

[51] Int. Cl.$^6$ ................................................ B60H 1/32
[52] U.S. Cl. ............................ 454/118; 62/407; 454/91
[58] Field of Search .................................. 454/88, 90, 91, 454/118; 62/239, 329, 407, 413, 414

[56] References Cited

U.S. PATENT DOCUMENTS

| | | | |
|---|---|---|---|
| 1,071,449 | 8/1913 | McAfee | 63/413 |
| 4,143,588 | 3/1979 | Exier | 454/118 |
| 4,399,737 | 8/1983 | Severson | 62/239 X |
| 5,678,421 | 10/1997 | Maynard et al. | 62/407 |

OTHER PUBLICATIONS

"Carrier Bulkhead", Aero Industries Brochure, 1993.
"Air Chutes", Aero Industries Brochure, 1993.
"Lattice Bulkhead", Aero Industries Brochure, 1993.
"Solid Bulkhead", Aero Industries Brochure, 1993.
"Installation of Solid Bulkheads", Aero Industries Brochure, 1993.
"Pallet Stops", Aero Industries Brochure, 1993.
"Thermo King SB III Bulkheads", Aero Industries Brochure, 1993.
"Thermo King Super II Bulkheads", Aero Industries Brochure, 1993.
Better Air Flow–Better Temp Control, F/G Products, Inc., Jan. 1992.

*Primary Examiner*—Harold Joyce
*Attorney, Agent, or Firm*—Laubscher & Laubscher

[57] ABSTRACT

An air return baffle for refrigeration trailers is characterized by a unitary panel molded from synthetic plastic material and containing integral baffles for air movement to the refrigeration unit of the trailer. The panel is adapted for mounting in sealed relation adjacent the front wall of the trailer and at least partially covers the refrigeration unit. The lower portion of the panel contains a plurality of openings for drawing air into the cavity defined behind the panel. Air is directed by the baffles toward the refrigeration unit, and the air movement eliminates hot and cold spots within the trailer.

20 Claims, 8 Drawing Sheets

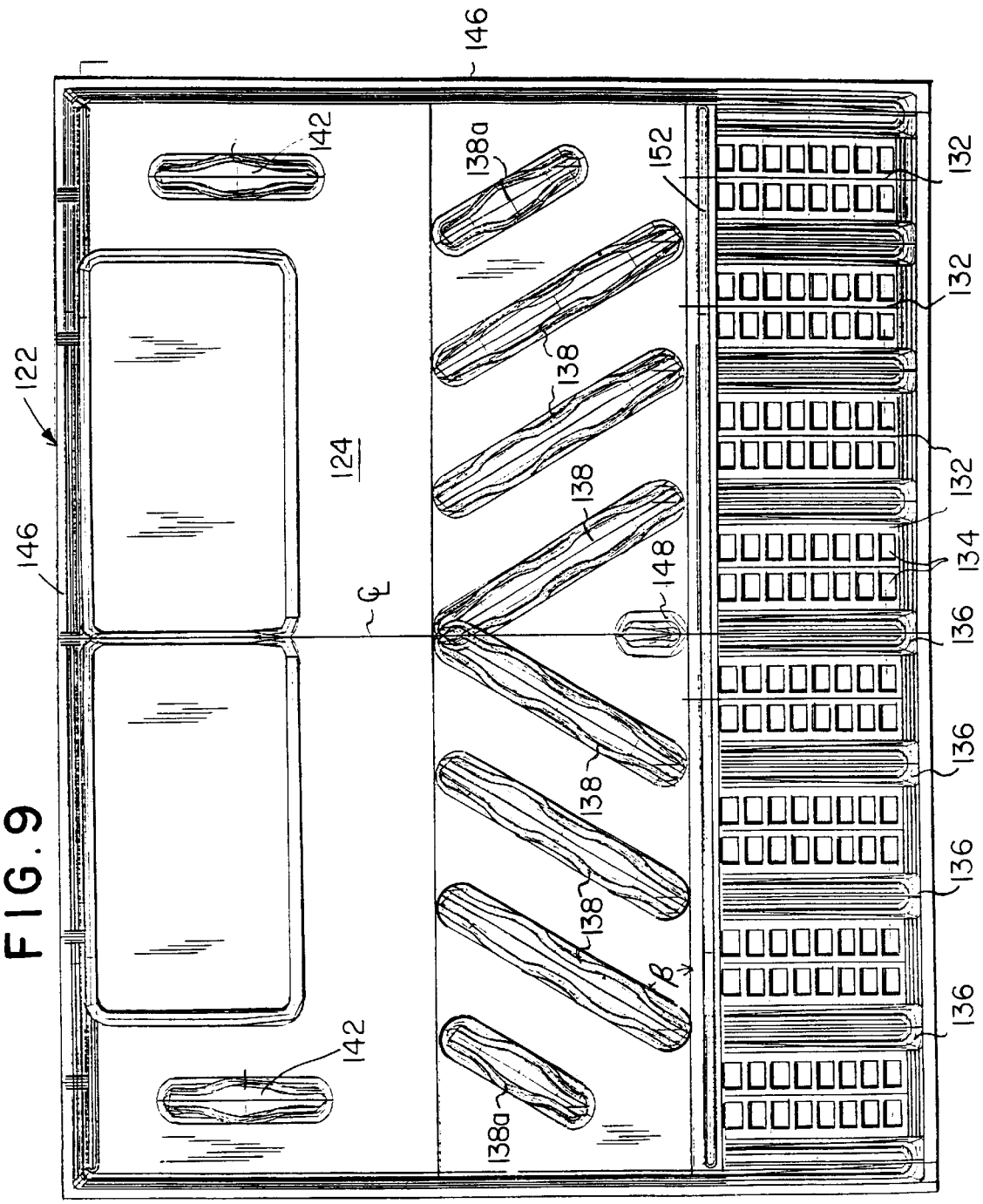

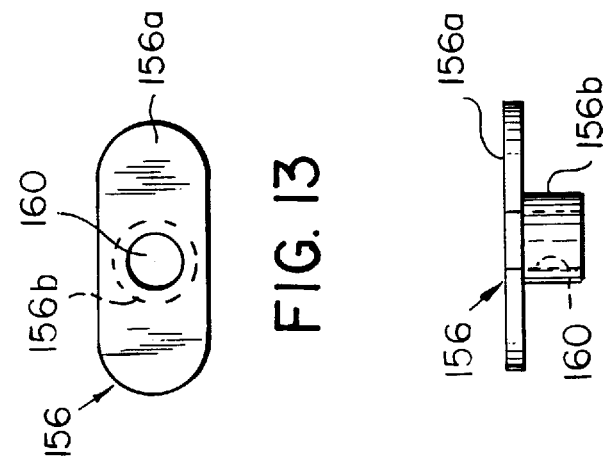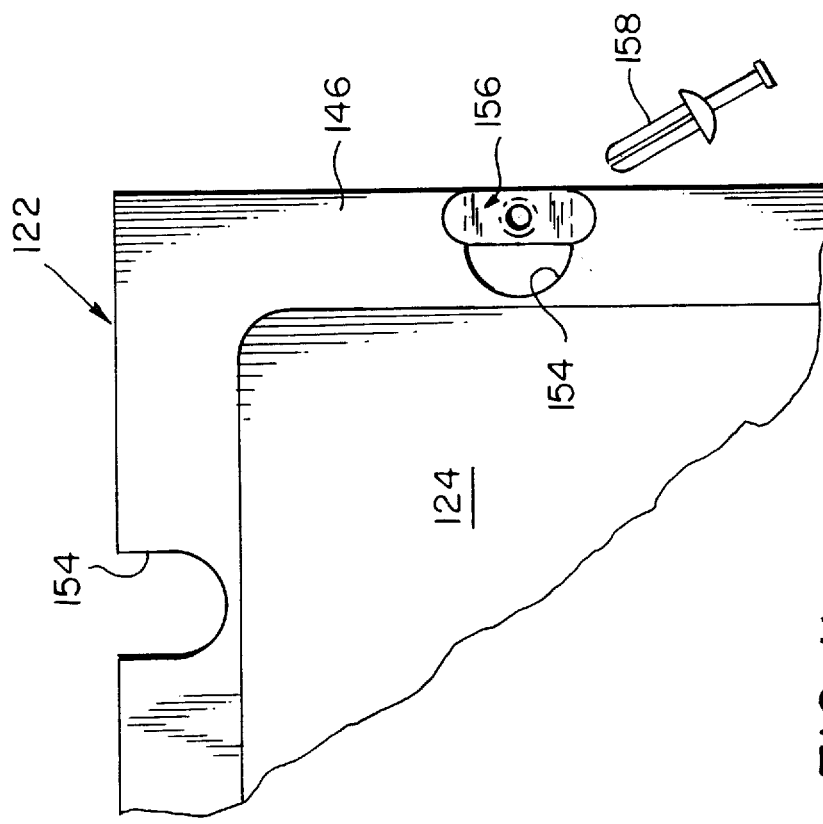

AIR RETURN BULKHEAD FOR REFRIGERATION TRAILERS

This application is a continuation-in-part of application Ser. No. 08/701,215, filed Aug. 21, 1996 now abandoned.

BACKGROUND OF THE INVENTION

A refrigeration bulkhead is a passive device mounted on the inside front wall of a refrigeration trailer. It generally covers the width of the front wall and has a height either halfway up or fully covering the front wall, thereby covering all or part of a refrigeration unit generally mounted at the upper center portion of the wall. The bulkhead serves two functions. First, it creates a space between the trailer load and the trailer front wall. This space is used to facilitate air movement from the floor of the trailer up the front wall to the refrigeration unit. Through its air intake, the refrigeration unit can remove heat from the air and exhaust the heat to the outside of the trailer. Second, the bulkhead protects the refrigeration unit from fork lifts or other loading devices and their loads.

BRIEF DESCRIPTION OF THE PRIOR ART

Refrigeration trailer bulkheads are well known. The earliest bulkhead was a wooden pallet arranged on end to protect the refrigeration unit while still providing air flow. The temporary pallet was then replaced with a more permanent and aesthetically pleasing lattice work assembly of aluminum uprights and crossmembers. While these prior bulkheads afforded protection to the refrigeration unit, they did not provide directional air flow throughout the trailer resulting in short cycling, i.e., uneven temperature distribution within the trailer.

As the need for directional airflow within the trailer was recognized, solid bulkheads replaced lattice work structures. Essentially, the cross members of the lattice were replaced by solid sheets of plywood, fiberglass reinforced plywood, or thin gauge aluminum. The bulkhead extended between the sides of the trailer and was sealed at the top, with the bottom being left open for a return air intake.

Most recently, molded polyethylene bulkheads have been introduced as solid bulkheads. These are strong enough to resist impact and include several vertically arranged ribs which direct air through the space between the bulkhead and the trailer front wall. At the bottom of each rib is a small triangular shaped opening for air intake. Other air intake holes are located on the side of the vertical ribs. While the prior molded bulkheads are inexpensive, easy to install in a variety of trailers, and stackable, they do not fully overcome the short cycling problem referenced above because they do not provide adequate directional and cross-directional directional return air flow to the refrigeration unit. Furthermore, they do not accommodate expansion and contraction due to fluctuating temperatures.

SUMMARY OF THE INVENTION

Accordingly, it is a primary object of the invention to provide an air return bulkhead adapted for mounting adjacent a refrigeration unit in spaced relation from a front vertical wall of a refrigeration trailer. The bulkhead includes a rectangular panel molded from synthetic plastic material and including a front wall and side, top, and bottom walls extending normal to the front wall to define a cavity. The front wall includes a plurality of horizontally spaced tapered sections in the lower portion thereof which define a plurality of pallet stops co-planar with the front wall. The tapered sections each contain a plurality of openings which enable air to enter the cavity from the bottom of the trailer. First and second baffles extend into the cavity from the rear of the front wall. The first baffles are arranged above the tapered sections and the second baffles are on opposite sides of the rear upper portion of the front wall. The baffles reinforce the panel and cooperate to direct air upwardly and toward the center of the cavity where the refrigeration unit is arranged.

According to another object of the invention, the first baffles are arranged at an angle relative to a horizontal line and extend upwardly toward a vertical centerline of the panel. The first and second baffles each contain at least one recess enabling air to pass therethrough.

It is a more specific object of the invention to provide a plurality of integral flanges extending from the top, bottom and side walls generally parallel to the front wall. The flanges can be trimmed in order to fit the panel within trailers of different dimensions. An improved mechanism for fastening the bulkhead to the trailer wall via the flanges is also provided.

BRIEF DESCRIPTION OF THE FIGURES

Other objects and advantages of the invention will become apparent from a study of the following specification when viewed in the light of the accompanying drawing, in which:

FIG. 9, is a front plan view of a preferred embodiment of the air return bulkhead of the invention.

FIG. 11, is a front plan view of the panel flanges illustrating the fastening assembly therefor; and FIGS. 12 and 13 are front and top plan views, respectively, of a washer used for the fastening assembly of FIG. 11.

DETAILED DESCRIPTION

Figure 1:
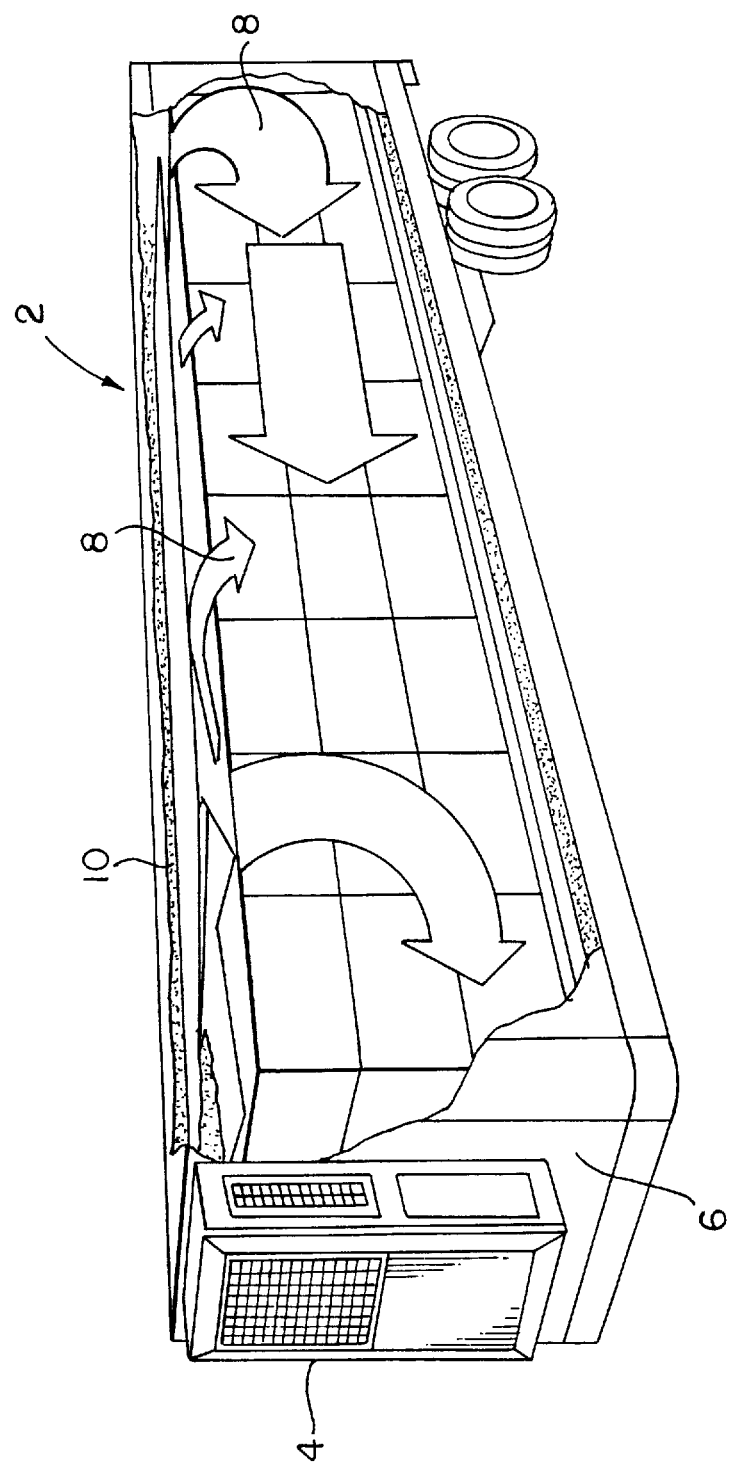
FIG. 1 is a cutaway perspective view of a refrigeration trailer illustrating the optimum air flow therethrough.

The field of the invention will first be described with reference to FIG. 1 wherein a refrigeration trailer 2 is shown. These trailers are used to transport numerous refrigerated products including ice cream, produce, meat, computers, and dry goods. Accordingly, they include a refrigeration unit 4 which is mounted on the front wall 6 of the trailer toward the top and center thereof. The refrigeration unit cools air within the trailer, exhausts heat to the exterior of the trailer, and distributes the cooled air into and through the trailer. As shown by the arrows 8, internal return air ideally is drawn into the refrigeration unit at the bottom front of the trailer and distributed adjacent the top wall 10 of the trailer toward the rear. The cool air falls to the floor at the rear and along the sides of the trailer where it is drawn back to the refrigeration unit.

Figure 2:
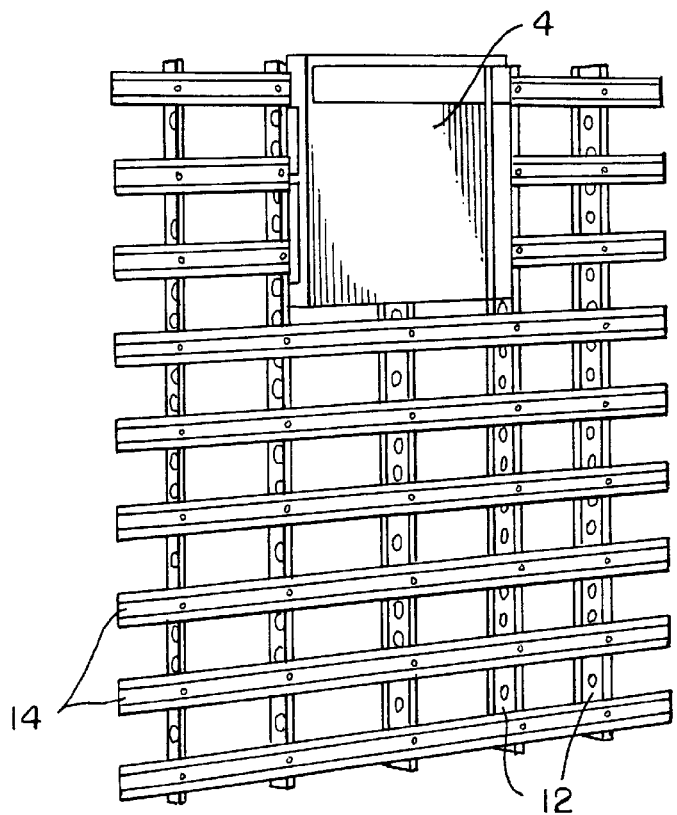
FIGS. 2 and 3 are perspective views, respectively, of refrigeration trailer bulkheads according to the prior art.

In order to protect the refrigeration unit from the load and from forklifts used to load the trailer and to afford air flow to the refrigeration unit, bulkheads were developed for the front wall of the trailer. In FIG. 2, there is shown a lattice work bulkhead comprising vertical aluminum z-bars 2 and aluminum cross bars 14. In addition to being labor intensive to install, lattice type bulkheads do not provide directional return air flow to the refrigeration unit within the trailer resulting in short cycling and hot and cold spots within the trailer rather than a desirable uniform temperature.

Figure 3:
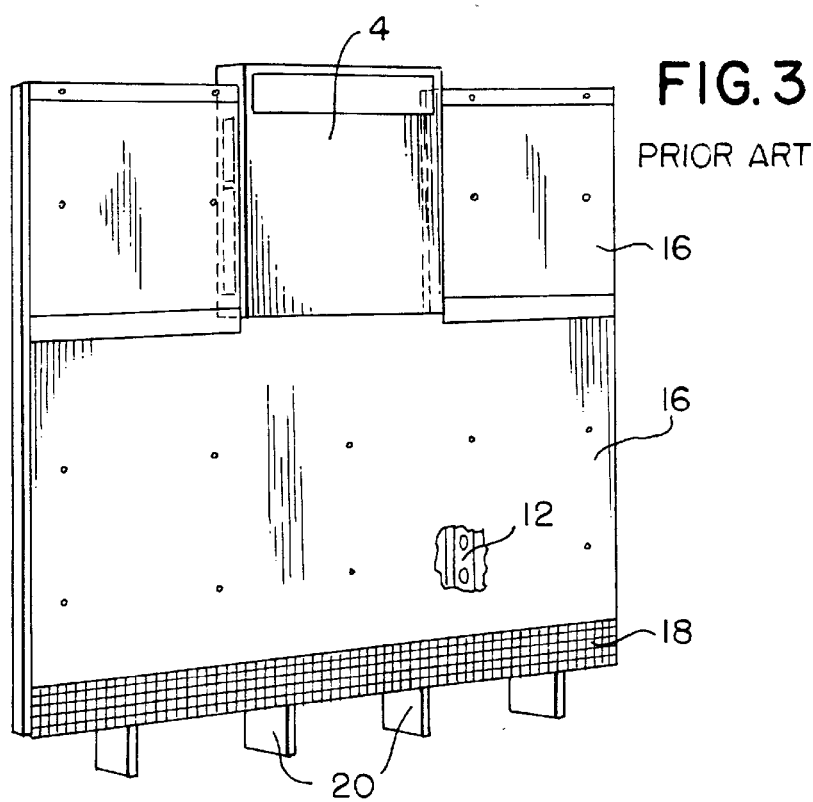

In order to improve air flow, a solid bulkhead was developed as shown in FIG. 3. This bulkhead retained the vertical aluminum columns 12 but replaced the cross members with sheets of plywood 16 which in some instances included fiberglass for reinforcement. An apertured screen 18 is arranged along the bottom of the bulkhead and serves as an air inlet. Pallet stops 20 at the bottom of the columns 12 are provided to prevent damage to the bulkhead and the refrigeration unit. Although an improvement over the lattice type bulkheads, the solid fiberglass reinforced plywood bulkhead of FIG. 3 is expensive and heavy making it difficult to install and requiring custom fitting for each size trailer.

Turning now to FIGS. 4–8, the air return bulkhead according to the invention will be described. The bulkhead is essentially a unitary panel 22 which is molded from synthetic plastic material into a generally rectangular configuration. As well be developed below, the panel can be formed with a standard width and height and then trimmed to fit refrigeration units of different configurations. Preferably, the width of the panel is such that the panel extends generally across the width of the trailer front wall. The height of the panel is at least half the height of the front wall and preferably selected so that the panel extends over at least the air return of the refrigeration unit. The panel is adapted for mounting within the trailer adjacent to but spaced from the front wall to define an air return space between the panel and the trailer wall. No support members are required.

Figure 6:
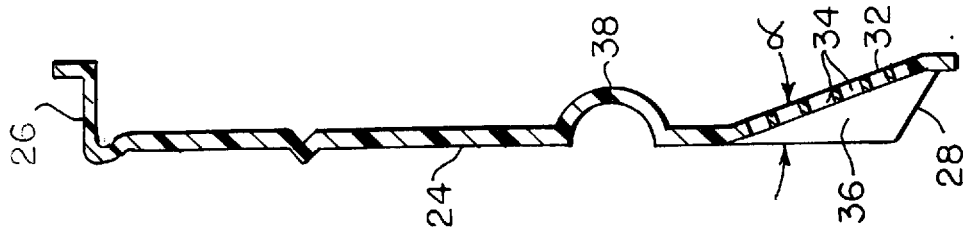

The panel 22 includes a front wall 24, a top wall 26, a bottom wall 28, and side walls 30. The top, bottom, and side walls extend in a direction normal to the planar front wall to define a cavity for air flow. Along the bottom, the panel front wall includes a plurality of spaced tapered sections 32. As shown in FIG. 6, the taper extends downwardly and rearwardly at an angle $\alpha$ relative to the plane containing the front wall. The angle $\alpha$ is on the order of 30°. Each tapered section contains a plurality of openings 34 which allow air to be drawn into the cavity. The openings are preferably arranged in rows and columns, with the same number of openings being provided in each section so that air is drawn into the cavity uniformly from across the bottom of the panel. The tapered sections containing the openings further act as a filter to prevent debris from entering the cavity.

Between the tapered sections 32 the remaining portions of the front wall define bumpers or pallet stops 36 against which a pallet bearing a load can be placed within the trailer.

Figure 4:
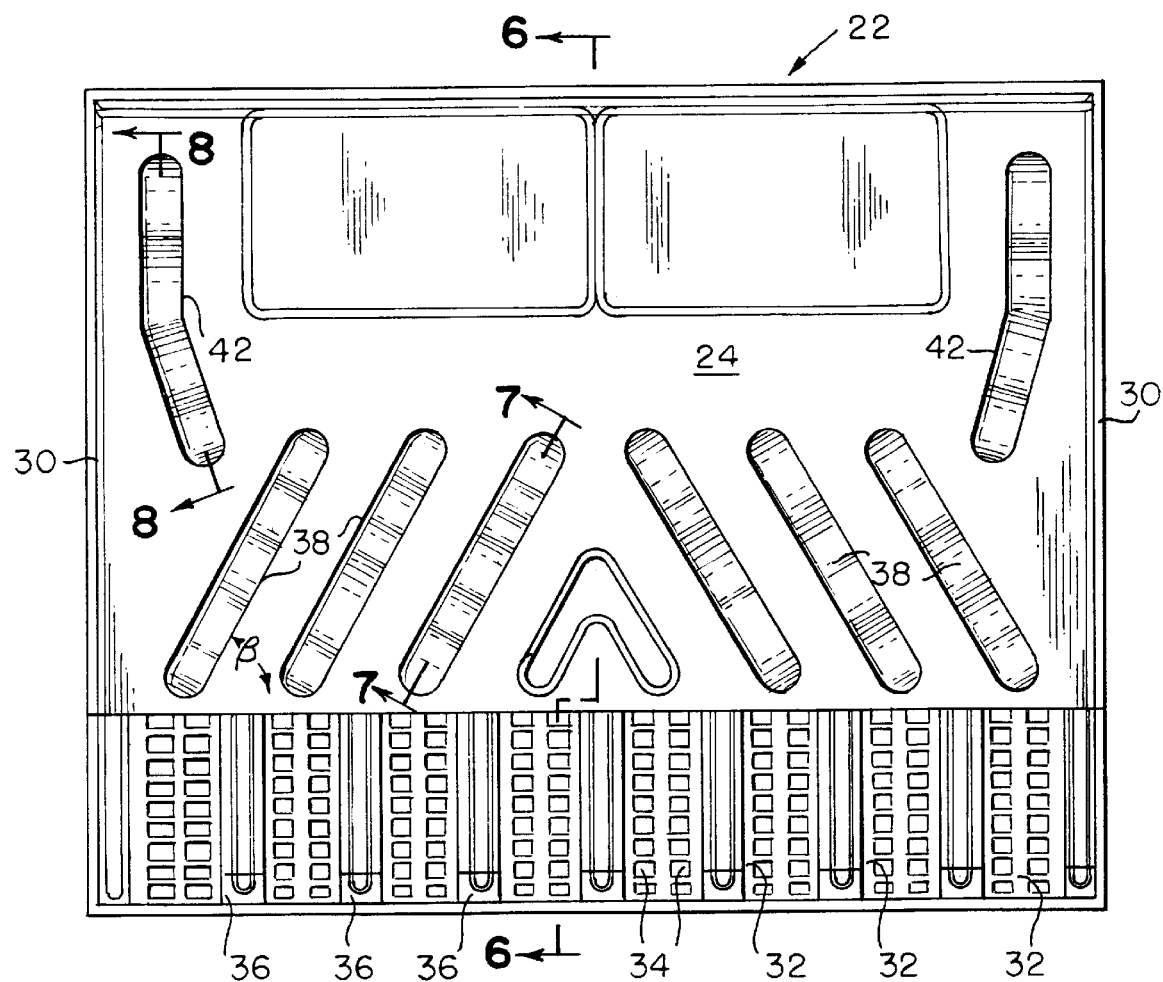
FIGS. 4 and 5 are front plan and perspective views, respectively, of the air return bulkhead according to the invention.
Figure 7:
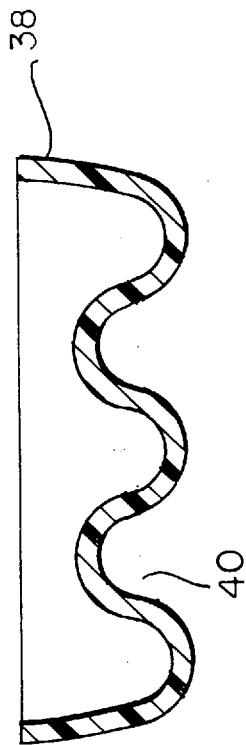
FIG. 6, 7, and 8 are sectional views taken along lines 6—6, 7—7, and 8—8, respectively of FIG. 4.
Figure 8:
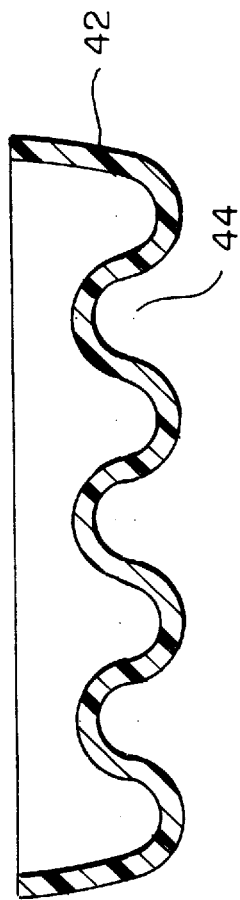

A plurality of first baffles 38 are integrally molded within the panel front wall 24. More particularly, the baffles extend into the cavity from the rear surface of the front wall. Each baffle has a sinusoidal configuration as shown in FIG. 7 to define recesses 40 through which air may pass. As shown in FIG. 4, the first baffles are arranged in two sets on opposite sides of the panel. Each of the baffles extends upwardly toward the vertical centerline at an angle $\beta$ relative to horizontal. The angle $\beta$ is preferably 60°.

A pair of second curved baffles 42 are provided adjacent the upper portions of the side walls 30. The second baffles are also integrally molded with the panel and extend from the rear surface thereof with a sinsusoidal configuration to define a plurality of recesses 44.

The first baffles 38 direct air from the openings 34 upwardly and toward the center of the panel where the refrigeration unit is located. The second baffles 42 direct air laterally toward the upper central portion of the panel. Thus, the baffles cooperate to circulate air toward the refrigeration unit. The recesses in the baffles afford cross-ventilation and equalize the pressure and air flow within the cavity. These two features improve air movement and result in increased efficiency of the refrigeration unit which receives air from the bulkhead and exhausts warm air to the outside of the trailer and cooled air to the interior of the trailer adjacent the top wall as shown in FIG. 1. Moreover, the sinusoidal configuration of the baffles reinforce the panel since the portions between the recesses can abut against the front wall of the trailer.

The top 26, bottom 28, and side 30 walls of the panel each include a flange 46 extending therefrom in a direction parallel to the front wall. The flange can be trimmed to adapt the panel to differently sized trailers, so that once installed, such as by screwing the panel to the walls of the trailer, a sealed bulkhead is provided, but for the openings 34 along the bottom thereof.

Figure 10:
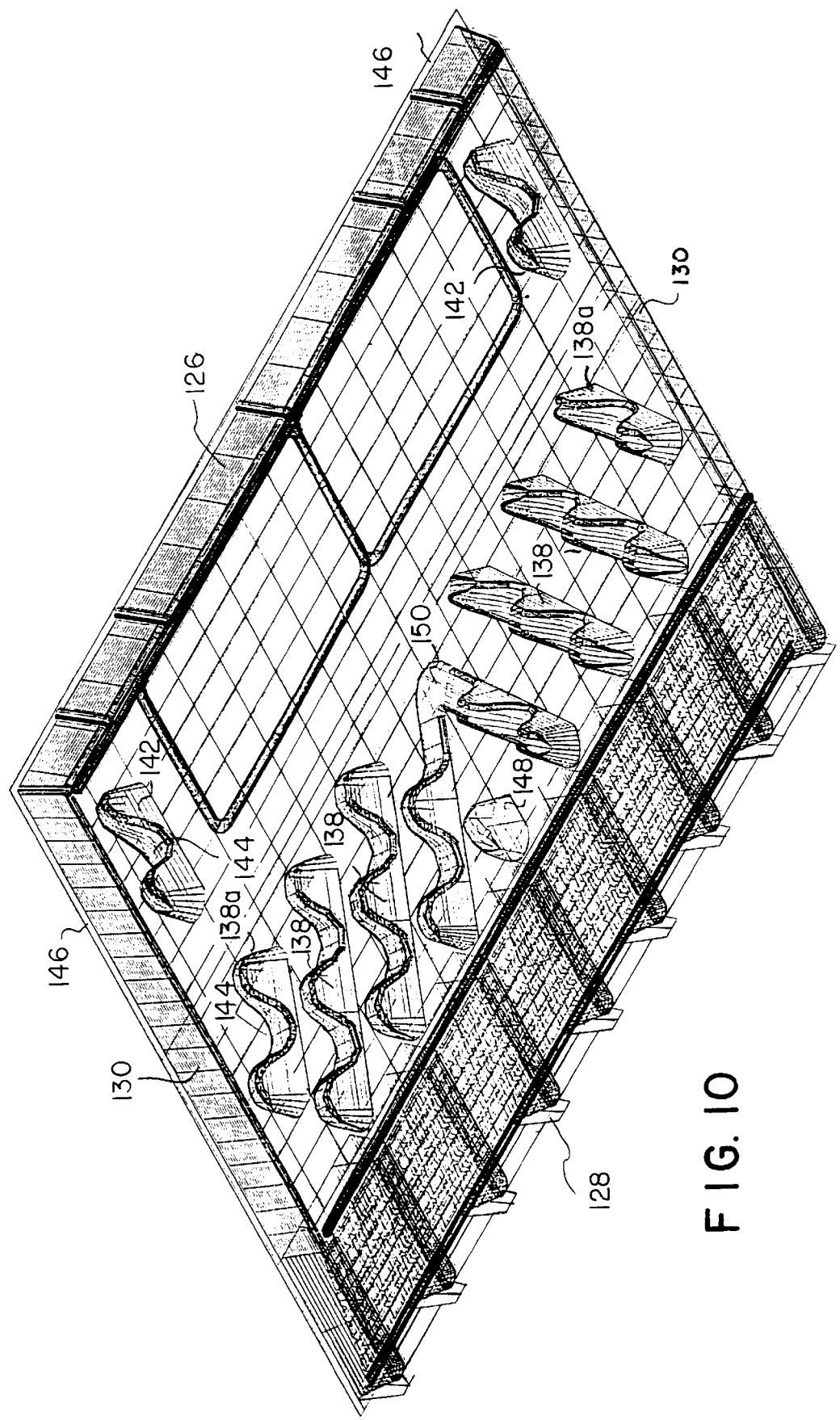
FIG. 10, is a rear perspective view of the bulkhead of FIG. 9.

A preferred embodiment of the invention is illustrated in FIGS. 9 and 10. As is evident from these figures, the rectangular panel 122 is similar to that of the embodiment of FIGS. 4–6 and includes a front wall 124, a top wall 126, a bottom wall 128, and side walls 130 which define an air flow cavity. The front wall includes spaced tapered sections 132 containing openings 134 and defining pallet stops 136. A flange 146 extends from the top, bottom, and side walls.

Figure 5:
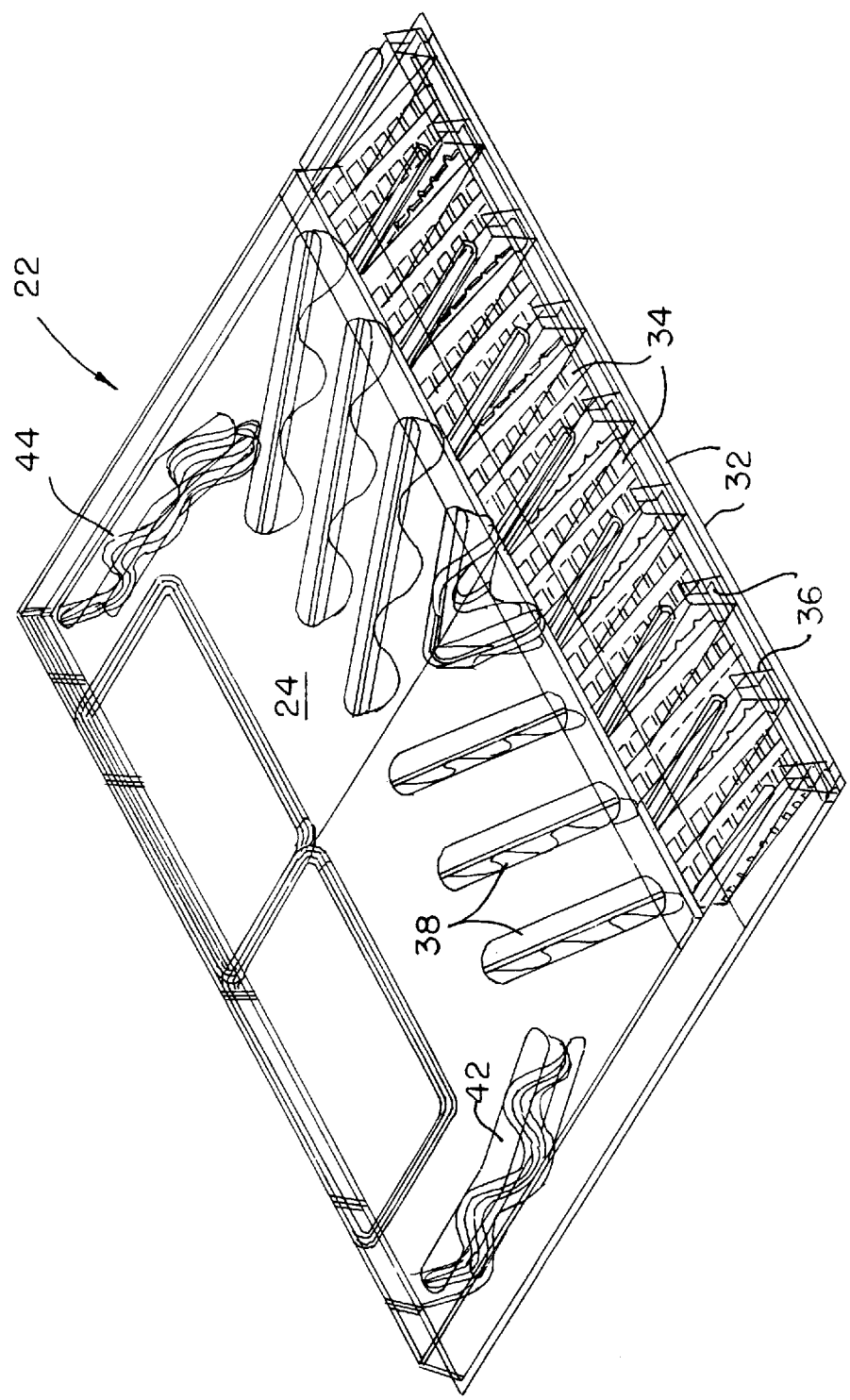

The primary difference in the embodiment of FIGS. 9 and 10 from that of FIGS. 4–6 is in the configuration of the first baffles 138 and the second baffles 142. As best shown in FIG. 9, the lower portion of the baffles 138 are aligned with the pallet stops 136. This arrangement improves the air flow of the bulkhead since air 5 entering the cavity via the openings 134 in the tapered sections 132 passes upwardly and between the baffles 138. The outermost baffles 138a are truncated to allow a space between these baffles and the side walls 130. The second baffles 142 extend parallel to the vertical centerline CL of the panel. The first and second baffles 138 and 142 contain at least one recess 144 as shown in FIG. 10 to allow the passage of air therethrough.

The bulkhead of FIGS. 9 and 10 also includes a truncated third baffle 148 co-linear with the vertical centerline CL which is also aligned with a central pallet stop 136. Where the upper portions of the first baffles on opposite sides of the centerline intersect the first baffles have a portion 150 of reduced dimension as shown in FIG. 10. This enables air to flow through the intersecting baffles at the center of the bulkhead.

Another difference in the bulkhead of FIGS. 9 and 10 is the provision of a rib 152 extending laterally across the front panel 124 between the upper edges of the pallet stops 136 and the lower portions of the first and third baffles 138, 148. The rib, which may also be provided in the bulkhead of FIGS. 4–6, increases the rigidity and strength of the bulkhead.

One drawback to screwing the panels to the trailer wall is that the panels buckle or separate from the wall owing to expansion or contraction of the plastic material in response to temperature fluctuations. This deformation of the panels destroys the seal around the perimeter of the panel, whereby air flow behind the bulkhead is no longer controlled in the proper fashion.

In order to overcome this problem, an improved fastening system for the bulkhead is provided which allows for limited movement of the bulkhead relative to the trailer wall. Referring to FIG. 11, the flange 146 extending from the top, bottom, and side walls contains a plurality of slots 154 in the outer edge thereof, a washer 156 is arranged within and above each slot and is adapted to receive a self-tapping, screw or rivet 158. Referring to FIGS. 12 and 13, the washer 156 includes an oblong upper portion 156a and a depending shoulder portion 156b through which a rivet-receiving opening 160 passes. The shoulder portion 156b of the washer has a depth greater than the thickness of the flange and an outer diameter less than the width of slow 154. The top oblong portion 156a has a long dimension greater than the width of the slot. Because of the unique configuration of the washer, the bulkhead panel 122 is afforded a limited degree of movement relative to the wall to which it is fastened to accommodate expansion and contraction thereof.

While in accordance with the provisions of the patent statute the preferred forms and embodiments of the invention have been illustrated and described, it will be apparent to those of ordinary skill in the art that various changes and modifications may be made without deviating from the inventive concepts set forth above.

What is claimed is:

1. An air return bulkhead adapted for mounting adjacent a refrigeration unit in spaced relation from a front vertical wall of a refrigeration trailer, comprising
    (a) a generally rectangular panel including a front wall and side, top, and bottom walls extending normal to said front wall to define a cavity behind said front wall;
    (b) said panel front wall including a plurality of horizontally spaced tapered sections in the lower portion thereof extending toward the rear of said bottom wall, said tapered sections defining therebetween a plurality of pallet stops co-planar with said front wall, said tapered sections containing a plurality of openings which enable air to enter said cavity;
    (c) first angled baffle means extending from a rear surface of said front wall above said tapered sections for directing air upwardly toward an upper central portion of said panel; and
    (d) second baffle means extending from said front wall rear surface above said first baffle means and adjacent to said side walls for directing air laterally toward the upper central portion of said panel, whereby air from the trailer is drawn from the bottom and sides of the trailer and directed to the refrigeration unit by said panel to improve the overall cooling of the trailer and to eliminate hot and cold spots.

2. A bulkhead as defined in claim 1, wherein said panel is molded from synthetic plastic material.

3. A bulkhead as defined in claim 1, and wherein said first baffle means comprise a plurality of spaced parallel baffles extending upwardly toward a vertical centerline of said panel.

4. A bulkhead as defined in claim 3, wherein said first baffles are arranged at an angle of generally 60° relative to a horizontal line.

5. A bulkhead as defined in claim 3, wherein said second baffle means comprise a pair of curved baffles.

6. A bulkhead as defined in claim 5, wherein said baffles each contain at least one recess enabling air to pass therethrough.

7. A bulkhead as defined in claim 6, wherein said baffles and said pallet stops are integral with said panel.

8. A bulkhead as defined in claim 7, and further comprising a plurality of integral flanges extending from said top, bottom, and side walls generally parallel to said front wall, whereby said flanges can be trimmed to fit said panel in trailers of different dimensions.

9. A bulkhead as defined in claim 2, and further comprises a rib extending across said panel between said pallet stops and said first baffle means for strengthening said panel.

10. A bulkhead as defined in claim 4, wherein a majority of said first baffles each have a lower portion aligned with one of said pallet stops.

11. A bulkhead as defined in claim 10, wherein a pair of said first baffles have upper portions which intersect at said vertical centerline, said intersecting portions having a reduced dimension to allow air to pass therethrough.

12. A bulkhead as defined in claim 11, wherein said second baffle means comprise a pair of baffles extending parallel to said vertical centerline.

13. A bulkhead as defined in claim 12, and further comprising a third baffle co-linear with said vertical centerline and one of said pallet stops.

14. A bulkhead as defined in claim 13, wherein said first and second baffles each contain at least one recess enabling air to pass therethrough.

15. A bulkhead as defined in claim 14, wherein said baffles and said pallet stops are integral with said panel.

16. A bulkhead as defined in claim 15, wherein said panel is molded from synthetic plastic material, and further comprising a rib extending across said panel between said pallet stops and said first baffles for strengthening said panel.

17. A bulkhead as defined in claim 16, and further comprising a plurality of integral flanges extending from said top, bottom, and side walls generally parallel to said front wall, whereby said flanges can be trimmed to fit said panel in trailer of different dimensions.

18. A bulkhead as defined in claim 1, and further comprising means for connecting said panel with the trailer vertical wall.

19. A bulkhead as defined in claim 18, wherein said connecting means comprise
    (1) an integral flange extending from said top, bottom, and side walls generally parallel to said front wall, said flange containing a plurality of spaced slots in the edge thereof;
    (2) a washer arranged within each of said slots and including a portion engaging said flange; and
    (3) a fastening device passing through said washer into the trailer wall.

20. A bulkhead as defined in claim 19, wherein said washer includes a top portion having a long dimension greater than the width of said slot and a shoulder which passes through said slot, said shoulder having a depth greater than the thickness of said flange and an outer diameter less than the width of said slot, whereby said panel is afforded a limited amount of lateral movement with respect to the trailer wall to accommodate expansion and contraction of the panel.

* * * * *